US008149969B2

(12) United States Patent
Khan et al.

(10) Patent No.: US 8,149,969 B2
(45) Date of Patent: Apr. 3, 2012

(54) APPARATUS AND METHOD FOR REDUCED PEAK-TO-AVERAGE-POWER RATIO IN A WIRELESS NETWORK

(75) Inventors: Farooq Khan, Allen, TX (US);
Joonyoung Cho, Suwon-si (KR); Juho Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1020 days.

(21) Appl. No.: 11/518,506

(22) Filed: Sep. 7, 2006

(65) Prior Publication Data

US 2007/0081604 A1    Apr. 12, 2007

Related U.S. Application Data

(60) Provisional application No. 60/724,864, filed on Oct. 7, 2005.

(51) Int. Cl.
*H04L 1/02* (2006.01)
(52) U.S. Cl. ... 375/347; 375/316; 375/240; 375/240.26; 375/350
(58) Field of Classification Search ............... 375/347, 375/295, 316, 240, 240.26, 350
See application file for complete search history.

(56) References Cited

U.S. PATENT DOCUMENTS

| 5,703,910 | A | * | 12/1997 | Durvaux et al. | 375/322 |
| 5,914,982 | A | * | 6/1999 | Bjarnason et al. | 375/222 |
| 6,049,721 | A | * | 4/2000 | Serizawa et al. | 455/509 |
| 2003/0016761 | A1 | * | 1/2003 | Min | 375/298 |
| 2003/0123383 | A1 | * | 7/2003 | Korobkov et al. | 370/208 |
| 2003/0174780 | A1 | * | 9/2003 | Heikkila | 375/259 |
| 2003/0206600 | A1 | * | 11/2003 | Vankka | 375/261 |
| 2003/0210660 | A1 | * | 11/2003 | Wiberg et al. | 370/320 |

FOREIGN PATENT DOCUMENTS

WO    WO2005017643    * 2/2005    ............... 341/156

* cited by examiner

*Primary Examiner* — Chieh M Fan
*Assistant Examiner* — Leila Malek

(57) ABSTRACT

A wireless transmission device capable of communicating with a receiver according to a DFT-spread OFDM protocol. The wireless transmission device comprises a configurable spectral shaping filter block capable of performing spectral shaping of an outgoing signal. The wireless transmission device configures the configurable spectral shaping filter block to perform spectral shaping according to a peak-to-average power (PAPR) value associated with the outgoing signal. The multi-carrier protocol comprises one of orthogonal frequency division multiple access (OFDMA) and orthogonal frequency division multiplexing (OFDM).

20 Claims, 12 Drawing Sheets

APPARATUS AND METHOD FOR REDUCED PEAK-TO-AVERAGE-POWER RATIO IN A WIRELESS NETWORK

CROSS-REFERENCE TO RELATED APPLICATION(S) AND CLAIM OF PRIORITY

The present application is related to U.S. Provisional Patent No. 60/724,864, filed Oct. 7, 2005, entitled "Low PAPR Wireless Communication System". U.S. Provisional Patent No. 60/724,864 is assigned to the assignee of the present application and is hereby incorporated by reference into the present application as if fully set forth herein. The present application hereby claims priority under 35 U.S.C. §119(e) to U.S. Provisional Patent No. 60/724,864.

TECHNICAL FIELD OF THE INVENTION

The present application relates generally to wireless networks and, more specifically, to an OFDM network that uses spectral shaping filters.

BACKGROUND OF THE INVENTION

Orthogonal frequency division multiplexing (OFDM) is a multi-carrier transmission technique in which a user transmits on many orthogonal frequencies (or subcarriers). The orthogonal subcarriers are individually modulated and separated in frequency such that they do not interfere with one another. This provides high spectral efficiency and resistance to multipath effects. An orthogonal frequency division multiple access (OFDMA) system allows some subcarriers to be assigned to different users, rather than to a single user.

A Discrete Fourier Transform-spread OFDM system is particularly attractive for use in the uplink channel from a subscriber station to the base station. This is because a DFT-spread OFDM system has low peak-to-average power ratio (PAPR) characteristics. A key design parameter for OFDM and OFDMA power amplifiers is the requirement to minimize the generation of adjacent channel power (ACP) noise— undesired spectral components in adjacent transmission channels. Power amplifiers are more linear at lower input signal levels. Large input signals tend to drive a power amplifier into saturation. Thus, smaller signals experience less distortion and have lower ACP noise.

However, a sudden large signal peak still results in distortion and ACP noise. This is especially problematic in systems that have large peak-to-average power ratios (PAPRs), such as OFDM and OFDMA systems. To avoid this, power amplifiers often operate in back-off (BO) mode (i.e., reduced input signal) in order to accommodate large signal peaks. DFT-spread OFDM minimizes the PAPR in the uplink, which allows the subscriber station amplifier to operate with a smaller amount of back-off and provides the subscriber stations with higher transmit power and higher data rate.

Therefore, there is a need for improved multi-carrier (e.g., OFDM, OFDMA) transmission systems that minimize amplifier peak-to-average power ratio (PAPR) without suffering performance degradation. In particular, there is a need to maximize the performance of DFT-spread OFDM transmission techniques.

SUMMARY OF THE INVENTION

An improved OFDMA transmitter (e.g., subscriber station) is provided in which spectrum shaping filtering is done on a user-by-user basis. Decisions regarding the spectral shaping filter type and the spectral shaping filter parameters for a particular filter type are based on the PAPR requirement. In one embodiment, the OFDMA transmitter uses different spectrum shaping filters for the transmission of signaling/control information and for transmission of user data.

In another embodiment, the OFDMA transmitter uses different spectrum shaping filters according to the modulation technique used. In still another embodiment, the OFDMA transmitter uses different spectrum shaping filters depending on whether the transmission is in localized mode or in distributed transmission mode. In an advantageous embodiment, the OFDMA transmitter may implement puncturing of coded data bits to compensate for repeated samples in the filter transition band.

In one embodiment of the disclosure, a wireless transmission device is provided that is capable of communicating with a receiver according to a multi-carrier protocol using orthogonal frequencies. The wireless transmission device comprises a configurable spectral shaping filter block capable of performing spectral shaping of an outgoing signal, wherein the wireless transmission device configures the configurable spectral shaping filter block to perform spectral shaping according to a peak-to-average power (PAPR) value associated with the outgoing signal. The multi-carrier protocol comprises one of orthogonal frequency division multiple access (OFDMA) and orthogonal frequency division multiplexing (OFDM).

In another embodiment of the disclosure, a subscriber station is provided that is capable of communicating with a wireless network according to a multi-carrier protocol. The subscriber station comprises a size M Fourier Transform (FT) block capable of receiving input symbols and generating therefrom M FT pre-coded outputs; a configurable spectral shaping filter block capable of receiving the M FT pre-coded output and generating therefrom a plurality of spectrally shaped outputs; and a size N inverse Fourier Transform (IFT) block capable of receiving N inputs. The N inputs include the plurality of spectrally shaped outputs from the configurable spectral shaping filter. The size N IFT block generates therefrom N outputs to be transmitted to a base station of the wireless network, wherein the size M FT block and the size N IFT block are one of: 1) a Fast Fourier Transform (FFT) block and an inverse Fast Fourier Transform (IFFT) block; and 2) a Discrete Fourier Transform (DFT) block and an inverse Discrete Fourier Transform (IDFT) block.

The subscriber station configures the configurable spectral shaping filter block to perform spectral shaping according to a peak-to-average power (PAPR) value associated with a packet to be transmitted to the wireless network.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION OF THE INVENTION

Figure 1:
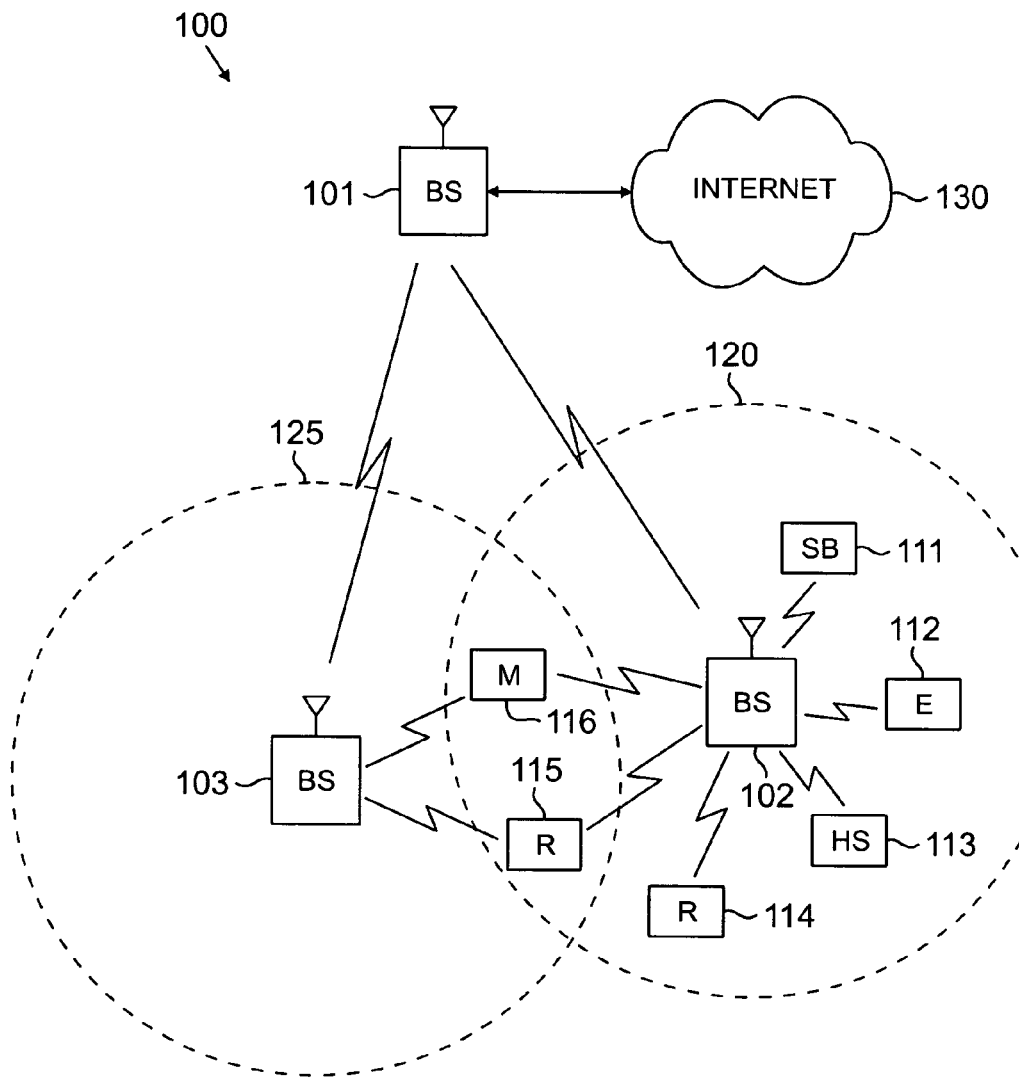
FIG. 1 illustrates an exemplary wireless network that reduces the peak-to-average power ratio (PAPR) or crest factor of OFDM or OFDMA signals according to the principles of the present disclosure.

FIGS. 1 through 12, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged wireless network.

A transmission technique is disclosed for reducing the peak-to-average power (PAPR) ratio—or crest factor—of the transmitted waveforms for multi-carrier signals, such as orthogonal frequency division multiplexing (OFDM) or orthogonal frequency division multiple access (OFDMA) signals. Reducing PAPR provides improved power amplifier efficiency, reduced heat dissipation requirements, smaller heat sinks, reduced power supply load, and lower cost for wireless base stations and subscriber stations. In the descriptions that follow, it shall be assumed generally that transmitters and receivers are operating in OFDMA mode. However, this embodiment should not be construed to limit the scope of the disclosure. In alternate embodiments, the transmitters and receivers may operate in OFDM mode or another multi-carrier mode without departing from the principles of the disclosure.

In the disclosed embodiment, a Discrete Fourier Transform (DFT)-spread OFDMA (or OFDM) transmission scheme is used for the uplink (i.e., subscriber station-to-base station link) of a wireless system due to its low peak-to-average power (PAPR) characteristic. This is due to the limited transmit power available in a subscriber station (or mobile station). A low PAPR requires less back-off and allows a subscriber station to transmit at a higher power and higher data rate, thereby improving the coverage and spectral efficiency of a wireless system. It will be understood that a DFT-spread OFDMA (or OFDM) transmission scheme may also be used for the downlink (i.e., base station-to-subscriber station link). However, the use of a DFT-spread OFDMA scheme is not as important in the downlink due to the greater transmit power available to base stations.

In an advantageous embodiment of the present disclosure, the DFT-spread OFDMA transmission scheme may perform an FFT pre-coding of the coded modulation symbols prior to mapping at the input to the IFFT block, as disclosed in U.S. patent application Ser. No. 11/374,928, filed Mar. 14, 2006 and entitled "Apparatus And Method For FT Pre-Coding Of Data To Reduce PAPR In A Multi-Carrier Wireless Network. Application Ser. No. 11/374,928 is assigned to the assignee of the present application and is hereby incorporated by reference into the present disclosure as if fully set forth herein. At the receiver, frequency-domain equalization (FDE) is performed after the FFT operation. An IFFT operation is then performed on the equalized symbols in order to obtain the data modulation symbols.

According to the principles of the present disclosure, the peak-to-average power ratio (PAPR) of the DFT-spread OFDM signals may be further reduced by spectral shaping of the FFT pre-coded data before mapping to the input of the IFFT block. It is noted that the order of the spectrum shaping and the mapping may be reversed. The spectral shaping (SS) filter reduces spectral efficiency due to the transition band of the SS filter. Examples of spectrum shaping filters are the Raised Cosine Nyquist filter, the Gaussian filter, the Hamming filter, the Hann filter, and others. Arbitrary spectrum shaping filters also may be designed based on empirical data, such as from simulations.

FIG. 1 illustrates exemplary wireless network 100, which reduces peak-to-average power ratio (PAPR) of multi-carrier signals, such as OFDMA signals, according to the principles of the present disclosure. In the illustrated embodiment, wireless network 100 includes base station (BS) 101, base station (BS) 102, base station (BS) 103, and other similar base stations (not shown). Base station 101 is in communication with base station 102 and base station 103. Base station 101 is also in communication with Internet 130 or a similar IP-based network (not shown).

Base station 102 provides wireless broadband access (via base station 101) to Internet 130 to a first plurality of subscriber stations within coverage area 120 of base station 102. The first plurality of subscriber stations includes subscriber station 111, which may be located in a small business (SB), subscriber station 112, which may be located in an enterprise (E), subscriber station 113, which may be located in a WiFi hotspot (HS), subscriber station 114, which may be located in a first residence (R), subscriber station 115, which may be located in a second residence (R), and subscriber station 116, which may be a mobile device (M), such as a cell phone, a wireless laptop, a wireless PDA, or the like.

Base station 103 provides wireless broadband access (via base station 101) to Internet 130 to a second plurality of subscriber stations within coverage area 125 of base station 103. The second plurality of subscriber stations includes subscriber station 115 and subscriber station 116. In an exemplary embodiment, base stations 101-103 may communicate with each other and with subscriber stations 111-116 using OFDM or OFDMA techniques.

Base station 101 may be in communication with either a greater number or a lesser number of base stations. Furthermore, while only six subscriber stations are depicted in FIG. 1, it is understood that wireless network 100 may provide wireless broadband access to additional subscriber stations. It is noted that subscriber station 115 and subscriber station 116 are located on the edges of both coverage area 120 and coverage area 125. Subscriber station 115 and subscriber station 116 each communicate with both base station 102 and base station 103 and may be said to be operating in handoff mode, as known to those skilled in the art.

Subscriber stations 111-116 may access voice, data, video, video conferencing, and/or other broadband services via Internet 130. In an exemplary embodiment, one or more of subscriber stations 111-116 may be associated with an access point (AP) of a WiFi WLAN. Subscriber station 116 may be any of a number of mobile devices, including a wireless-enabled laptop computer, personal data assistant, notebook, handheld device, or other wireless-enabled device. Subscriber stations 114 and 115 may be, for example, a wireless-enabled personal computer (PC), a laptop computer, a gateway, or another device.

Figure 2A:
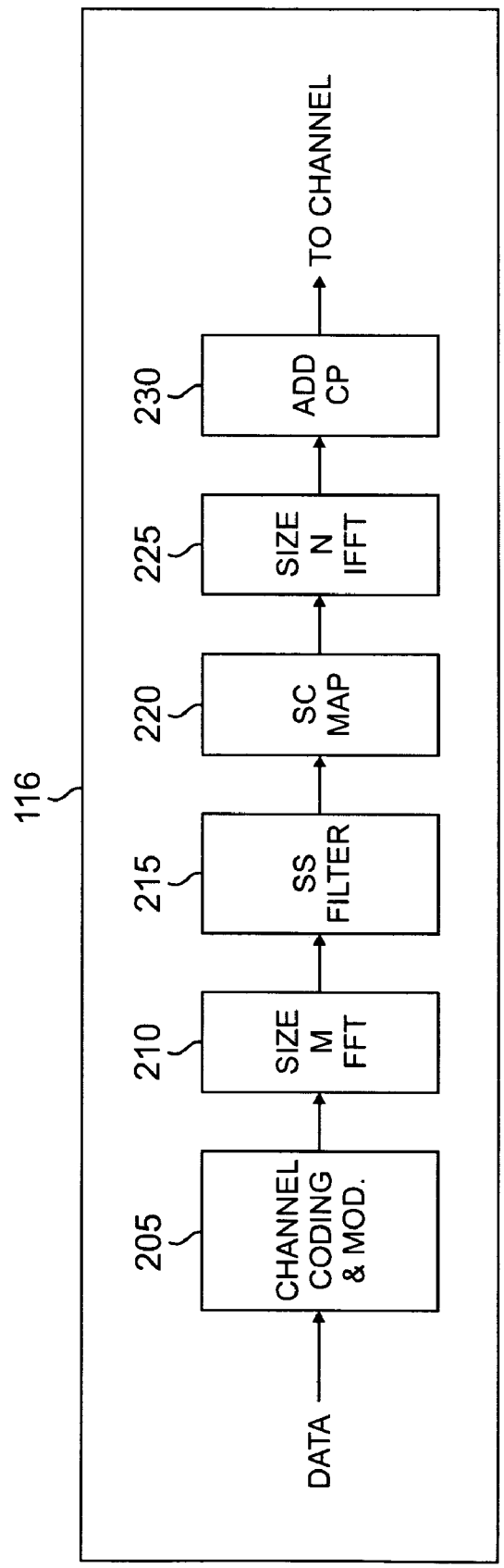
FIG. 2A is a high-level diagram of an orthogonal frequency division multiple access (OFDMA) transmit path.
Figure 2B:
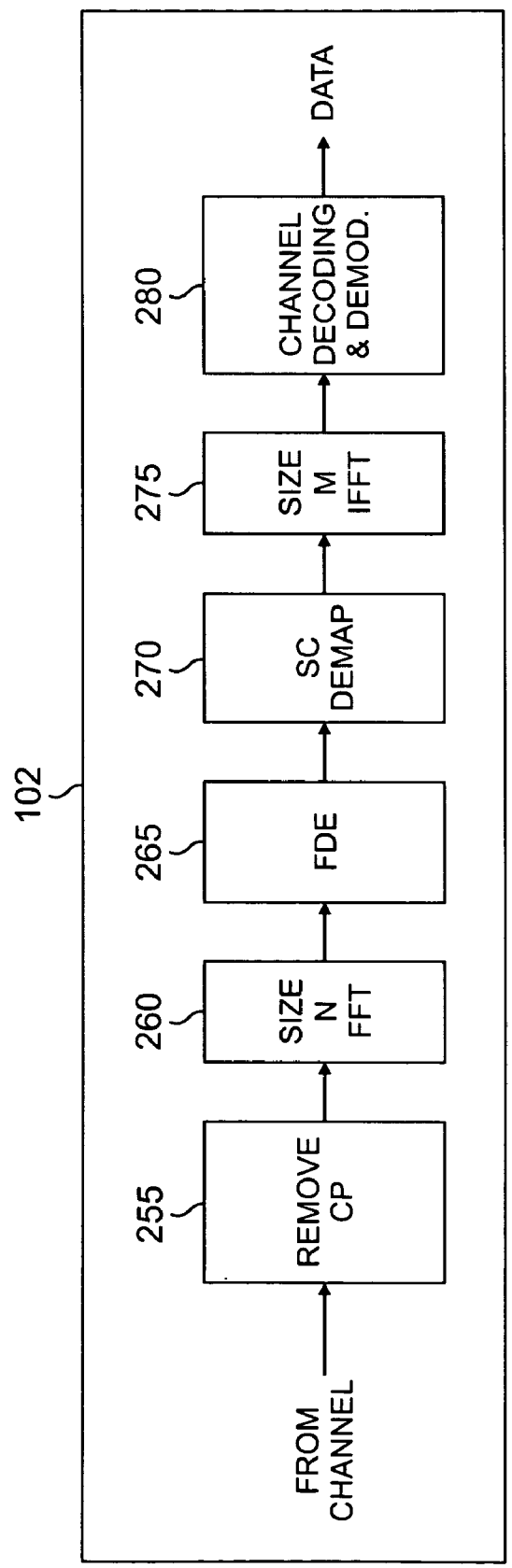
FIG. 2B is a high-level diagram of an orthogonal frequency division multiple access (OFDMA) receive path.

FIG. 2A is a high-level diagram of an orthogonal frequency division multiple access (OFDMA) transmit path. FIG. 2B is a high-level diagram of an orthogonal frequency division multiple access (OFDMA) receive path. In FIGS. 2A and 2B, the OFDMA transmit path is implemented in subscriber station (SS) 116 and the OFDMA receive path is implemented in base station (BS) 102 in order to depict FFT pre-coding operations and spectral shaping filtering operations in the uplink. However, it will be understood by those skilled in the art that the OFDMA transmit path may also be implemented in BS 102 and the OFDMA receive path may be implemented in SS 116 for downlink operations.

The transmit path in subscriber station (SS) 116 comprises channel coding and modulation block 205, Size M FFT block 210, spectral shaping (SS) filter block 215, subcarrier (SC) mapping block 220, Size N IFFT block 225, and add cyclic prefix (CP) block 230. The receive path in base station (BS) 102 comprises remove cyclic prefix (CP) block 255, Size N FFT block 260, frequency domain equalization (FDE) block 265, subcarrier demapping block 270, Size M IFFT block 275, and channel decoding and demodulation block 280.

At least some of the components in FIGS. 2A and 2B may be implemented in software while other components may be implemented by configurable hardware or a mixture of software and configurable hardware. In particular, it is noted that the FFT blocks and the IFFT blocks described in this disclosure document may be implemented as configurable software algorithms, where the values of Size M and Size N may be modified according to the implementation.

Furthermore, although the text and FIGS. 1-12 of the disclosure are directed to an embodiment that implements the Fast Fourier Transform and the Inverse Fast Fourier Transform, this is by way of illustration only and should not be construed to limit the scope of this disclosure. It will be appreciated that in an alternate embodiment of the disclosure, the Fast Fourier Transform functions and the Inverse Fast Fourier Transform functions may easily be replaced by Discrete Fourier Transform (DFT) functions and Inverse Discrete Fourier Transform (IDFT) functions, respectively. It will be appreciated that for DFT and IDFT functions, the values of the M and N variables may be any integer numbers (i.e., 1, 2, 3, 4, etc.), while for FFT and IFFT functions, the values of the M and N variables may be any integer numbers that are powers of two (i.e., 1, 2, 4, 8, 16, etc.).

Channel coding and modulation block 205 receives incoming data traffic bits and performs channel coding (e.g., turbo coding, Viterbi coding, etc.) and modulation to produce a stream of symbols. Size M FFT block 210 then FFT pre-codes the data symbols by performing a size M FFT operation. After the FFT operation, spectral shaping filter block 215 performs spectral shaping according to the selected filter design, including Raised Cosine Nyquist filter, the Gaussian filter, the Hamming filter, the Hann filter, and others.

Next, subcarrier mapping block 215 maps the spectrally-shaped, FFT pre-coded symbols to a selected set of subcarriers of the total of N subcarriers at the input of Size N IFFT block 225. Any additional control information, such as a pilot signal, is also mapped to predetermined subcarriers inputs of Size N IFFT block 225. Next, Size N IFFT block 225 performs a size N IFFT operation to generate a time domain signal. Add cyclic prefix (CP) block 230 adds a cyclic prefix to the time-domain signal from Size N IFFT block 225 before up-conversion (not shown) to RF range for transmission.

A sequence of reverse operations is performed in the receive path in base station (BS) 102. The receive path in BS 102 comprises down-conversion circuitry (not shown) that generates a baseband signal from the received radio frequency (RF) signal. After down-conversion, remove cyclic prefix block 255 removes the cyclic prefix from the time-domain baseband signal. Size N FFT block 260 converts the baseband signal to a frequency domain signal. FDE block 265 uses the known pilot signals to perform equalization on the data and other controls signals. The control and signaling information that was not FFT pre-coded is recovered directly from the outputs of FDE block 265. Subcarrier demapping block 270 demaps the FFT pre-coded data from selected ones of the outputs of FDE block 265 to the inputs of Size M IFFT block 275. Size M IFFT block 275 receives the FFT pre-coded data traffic from subcarrier demapping block 270 and performs a size M IFFT operation to recover the coded and modulated data symbols. Finally, channel decoding and demodulation block 280 demodulates and decodes the data symbols to recover the original user data traffic bits.

It is noted that the transmit path and receive path components described herein and illustrated in FIGS. 2A, 2B, 3A and 3B are configurable devices that may be re-programmed and controlled by the main controller or processor (not shown) associated with SS 116 or BS 102. For the purposes of simplicity and clarity, the main controllers/processors in SS 116 and BS 102 are not illustrated in FIGS. 2A, 2B, 3A and 3B.

Thus, for example, the main controller in SS 116 is operable to configure channel coding and modulation block 205 to adapt to different modulation techniques (e.g., BPSK, QPSK, QAM, etc.) as described below. Similarly, the main controller (not shown) in SS 116 is operable to configure SS filter 215 to implement different filter types and to adjust the filter parameters for each filter type. The main controller in SS 116 is also operable to modify the values of M and N. In BS 102, the main controller is similarly capable of configuring, for example, FDE block 265, subcarrier demapping block 270, channel decoding and demodulation block 280, and to modify the values of M and N. Moreover, the flow diagrams illustrated and described below may suitably be executed by the main controllers in SS 116 and BS 102.

Figure 3A:
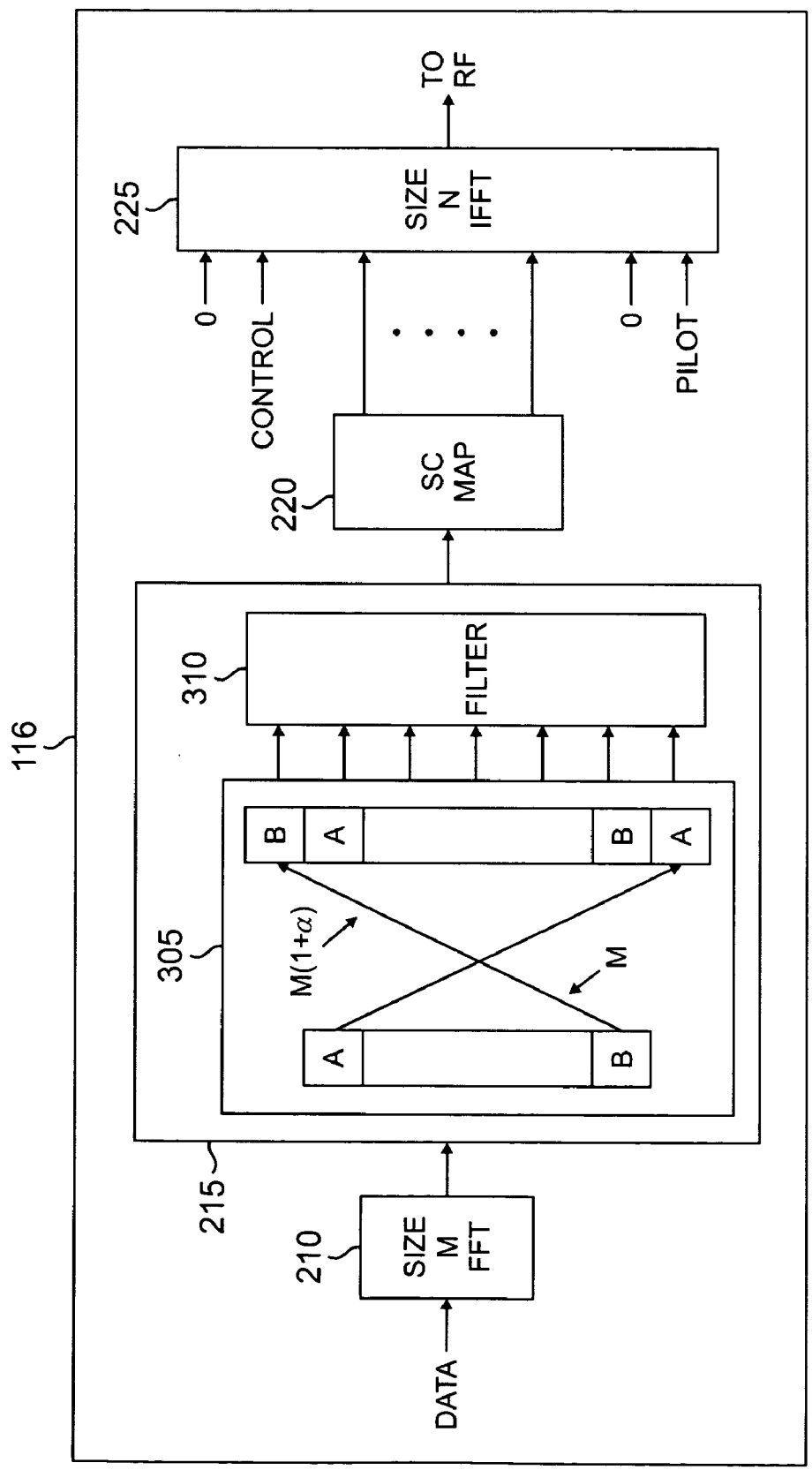
FIG. 3A illustrates selected portions of the OFDMA transmit path in the subscriber station in greater detail.
Figure 3B:
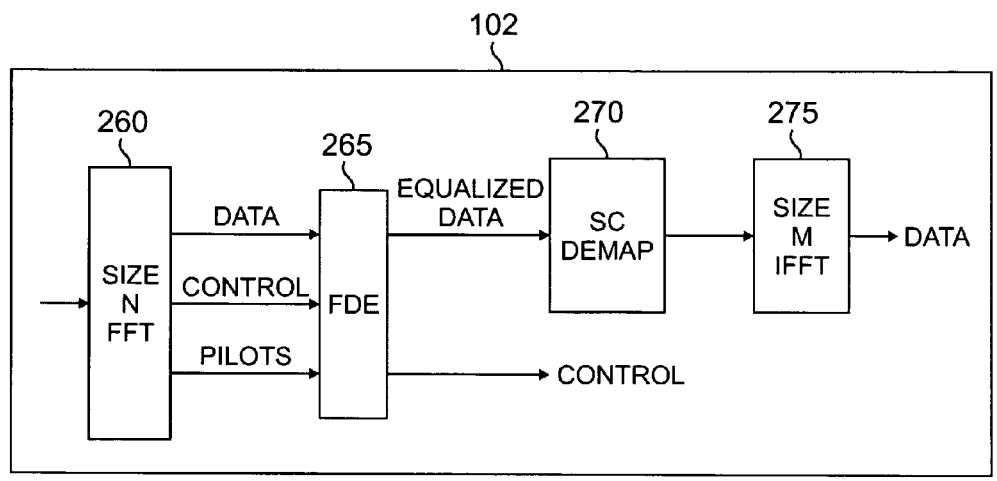
FIG. 3B illustrates selected portions of the OFDMA receive path in the base station in greater detail.

FIG. 3A illustrates selected portions of the OFDMA transmit path in subscriber station (SS) 116 in greater detail. FIG. 3B illustrates selected portions of the OFDMA receive path in base station (BS) 102 in greater detail. FIGS. 3A and 3B illustrate the selective FFT pre-coding of data, spectral shaping filtering, and frequency domain equalization (FDE) according to an embodiment of the present disclosure.

In SS 116, Size M FFT block 210 pre-codes the data traffic by performing a size M FFT operation. The M FFT pre-coded symbols from Size M FFT block 210 are then spectrally shaped by spectral shaping (SS) filter block 215. In this example, SS filter block 215 may be a raised cosine Nyquist filter, also known as a cosine roll-off filter.

SS filter block 215 comprises sample pre-arranging stage 305 and filter stage 310. Sample pre-arranging stage 305 copies a block of A samples from a first end of the original sequence of M samples to the second end of the original sequence. Similarly, sample pre-arranging stage 305 copies a block of B samples from the second end of the original sequence of M samples to the first end of the original sequence. Thus, if M samples are input to sample pre-arranging stage 305, then the number of samples at the output of sample pre-arranging stage 305 is $M(1+\alpha)$. Next, filter stage 310 performs the spectral shaping filter operations that multiply the samples from sample pre-arranging stage 305 by the filter coefficients.

The roll-off factor, $\alpha$, determines the excess bandwidth of the filter. For example, if M=64 and $\alpha$=0.25, then the number of samples at the output of SS filter block 215 is 64(1+0.25) =80. Thus, eighty (80) subcarriers are required to map these samples at the input of Size N IFFT block 225. This represents 25% excess bandwidth. Subcarrier (SC) mapping block 220 then maps the $M(1+\alpha)$=80 subcarriers to a selected subset of the OFDMA subcarriers (i.e., tones) at the inputs of Size N IFFT lock 225. Assuming IFFT size of N, the remaining $N-M(1+\alpha)$ inputs of Size N IFFT block 225 may receive a non-FFT pre-coded pilot signal, a non-FFT pre-coded control signal, or a zero input signal.

Next, Size N IFFT block 225 performs a size N IFFT operation on the FFT pre-coded data symbols, the pilot signal (s), the other signaling and control signal(s), and the zero input signal(s), if any. In an alternate embodiment, at least some of the signaling and control signals may also be FFT pre-coded. Finally, the outputs of Size N IFFT block 225 are passed on to add CP block 230 (not shown) and then to the radio frequency (RF) circuitry (not shown) for up-conversion.

In BS 102, Size N FFT block 260 performs a size N FFT operation on the received signal to recover the FFT pre-coded data, the non-FFT pre-coded pilot signal, the zero input signals (not shown), and the other control signals, which, in this case, are also not FFT pre-coded. Next, FDE block 265 uses the recovered pilot signal to equalize the FFT pre-coded data and the non-FFT pre-coded control signals in the frequency-domain. The received frequency-domain pilot information is used for channel estimation and equalization purposes. It is noted that the pilot symbols were inserted in SS 116 just before the IFFT operation, so that FFT pre-coding is not used for the pilot symbols. Therefore, pilot symbol transmission happens in the frequency-domain. This assures that a reliable channel estimate is available in the frequency-domain for frequency-domain equalization. Next, subcarrier (SC) demapping block 270 maps the M equalized data symbols to selected inputs of Size M IFFT block 275. Finally, Size M IFFT block 275 converts the equalized data symbols from the frequency domain to the time domain.

Figure 4:
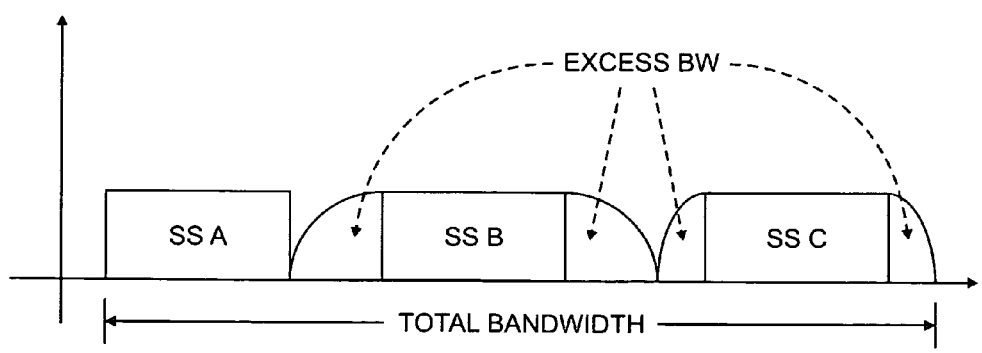
FIG. 4 illustrates multiple access and spectrum shaping in the wireless network according to one embodiment.

FIG. 4 illustrates multiple access and spectrum shaping for multiple subscriber stations in wireless network 100 according to one embodiment of the disclosure. According to the principles of the present disclosure, the spectral shaping filter type or filter characteristics, or both, may be selected dynamically, based on the peak-to-average power ratio (PAPR) requirement for a given subscriber station. In FIG. 4, it is assumed that three subscriber stations, namely SS A, SS B, and SS C, transmit at the same data rate and using the same useful bandwidth. Subscriber stations A-C may be any one of subscriber stations 111-116 in FIG. 1.

It also is assumed that SS A has power margin available (i.e., no excess bandwidth) and therefore does not require any PAPR reduction. SS B is severely power limited (i.e., larger excess bandwidth) and requires large reduction in PAPR. SS C is moderately power limited (i.e., smaller excess bandwidth) and requires moderate reduction in PAPR. The roll-off factors for SS A, SS B and SS C are selected as $\alpha_B > \alpha_C > \alpha_A = 0$. A roll-off factor of zero for SS A means no roll-off (i.e., a rectangular window filter with no excess bandwidth). The technique disclosed herein for dynamically selecting roll-off factor based on PAPR requirement results in an overall efficient system because the excess bandwidth is only required for subscriber stations requiring lower PAPR. Also, the amount of excess bandwidth is determined based on the desired reduction in PAPR.

Figure 5:
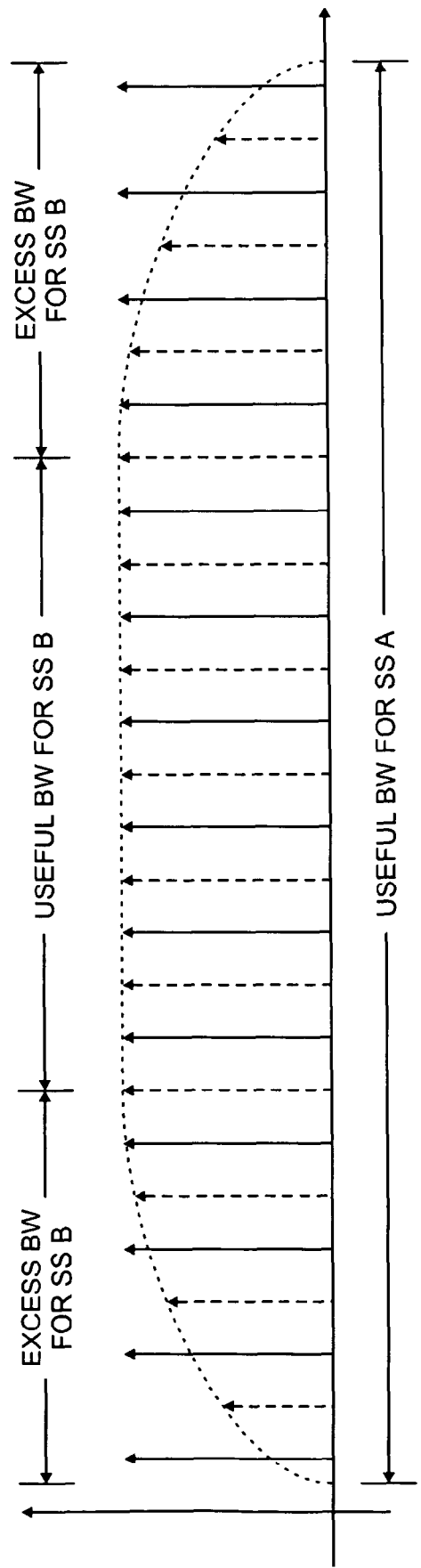
FIG. 5 illustrates spectral shaping for frequency-diverse distributed transmission according to one embodiment.

FIG. 5 illustrates spectral shaping for frequency-diverse distributed transmission according to one embodiment of the present disclosure. In frequency-diverse distributed transmission, multiple subscriber stations may be multiplexed with a comb-shape spectrum. The FFT-pre-coded symbols are mapped to uniformly distributed subcarriers at the input of the IFFT block. In FIG. 5, it is assumed that subscriber station A does not need lower PAPR and therefore can use a roll-off factor of zero. This allows SS A to distribute its FFT-pre-coded symbols, shown as solid-line arrows in FIG. 5, over the whole bandwidth.

In the case of subscriber station B, a lower PAPR is desired and therefore the useful bandwidth is smaller compared to subscriber station A. This is due to the transition band (i.e., excess BW) for SS B required in case of roll-off of greater than zero. The FFT pre-coded symbols for SS B are shown as dotted-line arrows in FIG. 5.

Subscriber station A has relatively larger useful bandwidth and may transmit data at a higher data rate using the same modulation and coding scheme as subscriber station B. Another alternative would be for SS A to use stronger modulation and coding due to larger bandwidth availability. This would allow SS A to transmit with the same data rate as SS B, but with lower transmit power. Lower transmit power reduces interference in the system, thereby improving overall system capacity. Using this approach, excess bandwidth is used only for subscribe stations requiring lower PAPR. Subscriber stations not requiring a lower PAPR may use the full bandwidth.

Figure 6:
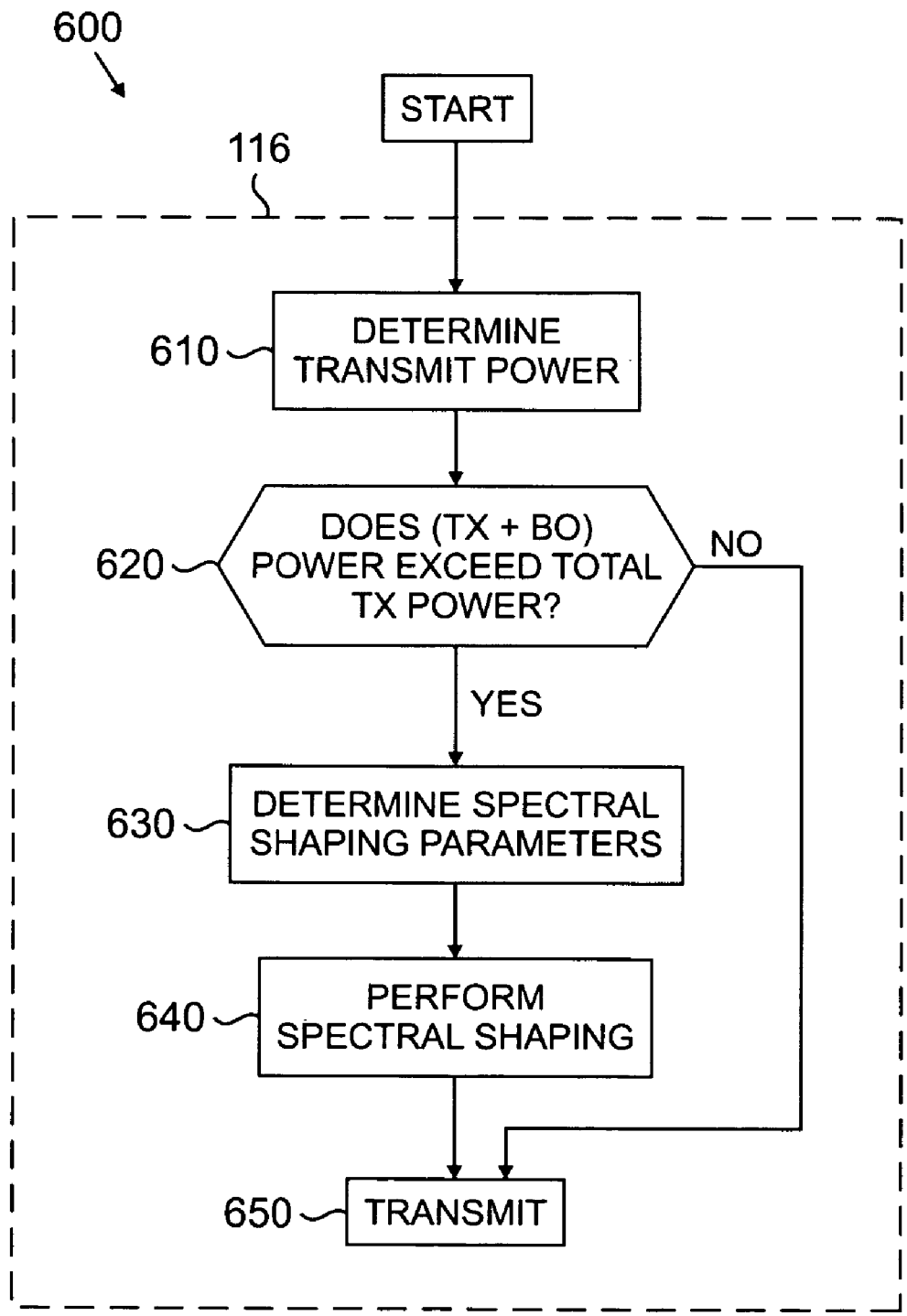
FIG. 6 is a flow diagram for determining whether or not spectral shaping should be used according to one embodiment.

FIG. 6 depicts flow diagram 600, which illustrates a process for determining whether or not spectral shaping should be used according to one embodiment of the present disclosure. Initially, subscriber station (SS) 116 determines its required transmit power based on, among other factors, the data rate and power control information (process step 610).

Next, SS 116 determines whether or not spectral shaping is required or not (process step 620). The determination is based (among other factors) on whether the required transmit (TX) power and the required back-off (BO) power of the amplifier exceed the maximum transmit power. If the (TX+BO) power does not exceed the total transmit power, the signal is transmitted without any spectral shaping (process step 650).

If the (TX+BO) power exceeds the total transmit power, spectral shaping must be performed. In that case, SS 116 determines the spectral shaping filter type and the corresponding spectral shaping parameters (process step 630). For example, in case of raised cosine Nyquist filter, the roll-off factor is determined based on the required reduction in PAPR. SS 116 then performs spectral shaping according to the determined filter type and spectral shaping parameters (process step 640). The spectrally shaped signal is then transmitted (process step 650).

Figure 7A:
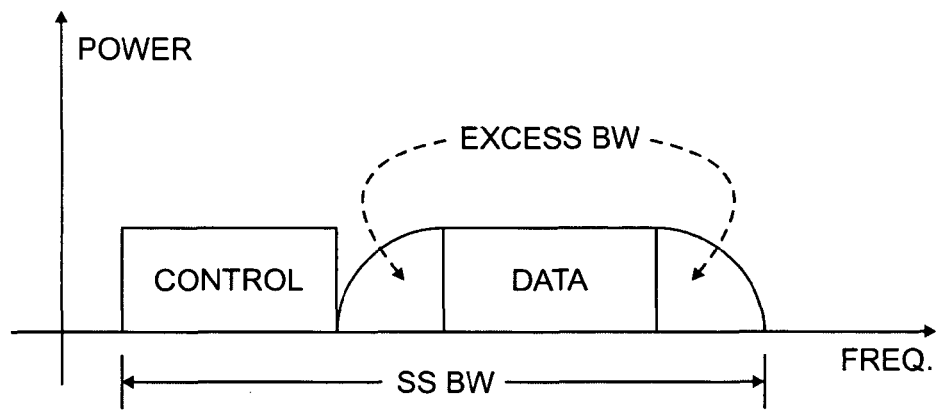
FIG. 7A illustrates spectral shaping for frequency-multiplexed control signals and data signals from the same subscriber station using different spectral shaping parameters.

FIG. 7A illustrates spectral shaping for frequency-multiplexed control information and user data from the same subscriber station using different spectral shaping parameters according to one embodiment of the disclosure. The control and signaling information in the uplink generally comprises, among other things, information about the block size, modulation, coding, hybrid ARQ sequence number, and the like. In FIG. 7, it is assumed that the control/signaling information does not use any spectral shaping.

Figure 7B:
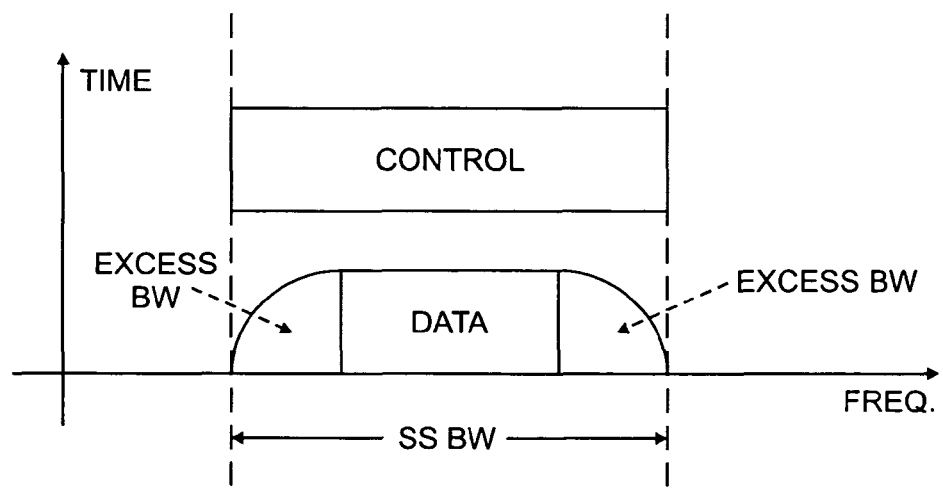
FIG. 7B illustrates spectral shaping for time-multiplexed control signals and data from the same subscriber station using different spectral shaping parameters.

FIG. 7B illustrates spectral shaping for time-multiplexed control information and user data from the same subscriber station using different spectral shaping parameters according to one embodiment of the disclosure. In FIG. 7B, it is again assumed that the control/signaling information does not use any spectral shaping. The spectrally shaped user data is transmitted first using all of the available bandwidth. The control and signaling information is subsequently transmitted using all of the available bandwidth, but without spectral shaping.

Figure 8:
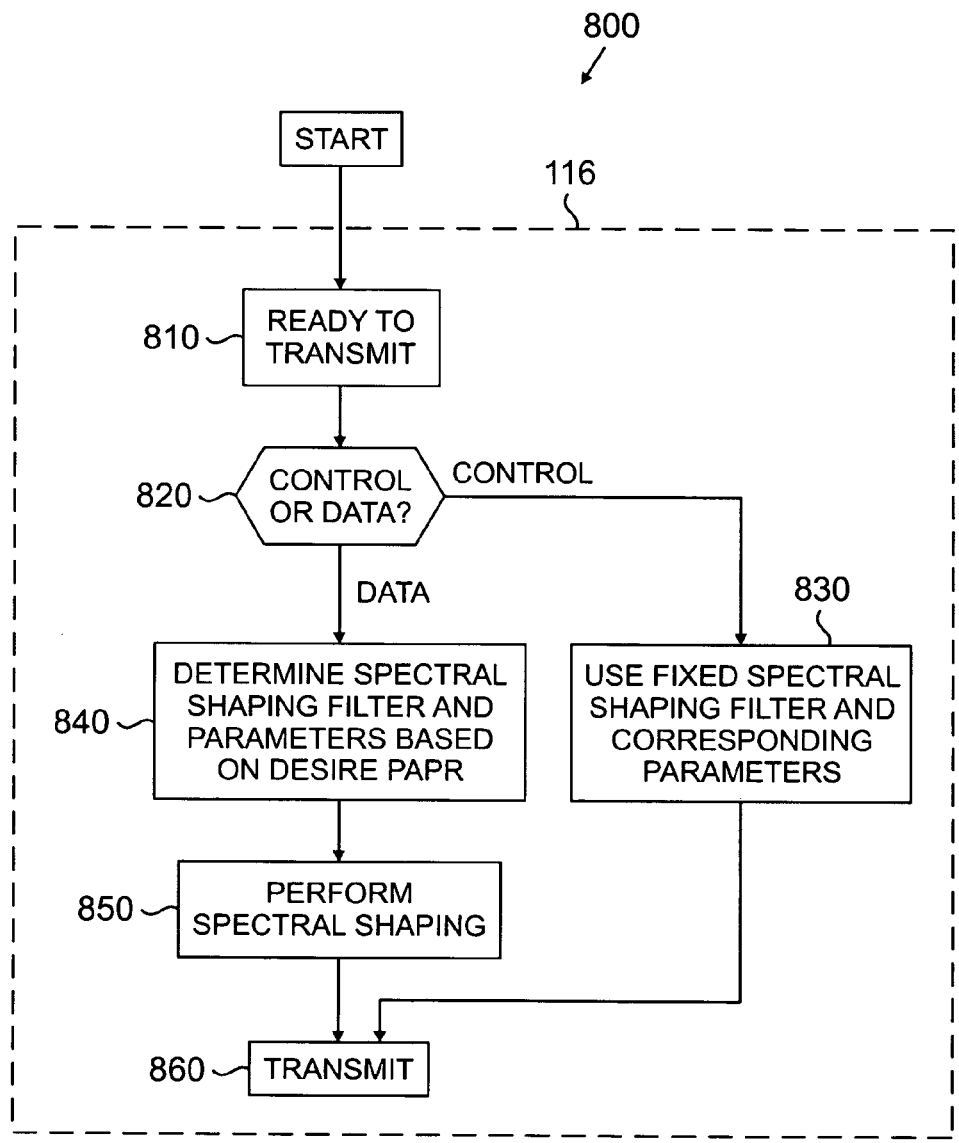
FIG. 8 is a flow diagram for determining whether or not spectral shaping should be used according to another embodiment.

FIG. 8 depicts flow diagram 800, which illustrates a process for determining whether or not spectral shaping using different spectral shaping parameters for control information and user data should be used according to one embodiment of the present disclosure. Initially, SS 116 determines that SS 116 is ready to transmit control information or user data to BS 102 (process step 810). SS 116 then determines whether the information packet to be transmitted contains control information or user data (process step 820).

If control information is being sent in the uplink, SS 116 uses a fixed spectral shaping filter, for which the corresponding filter parameters are known at BS 102 (process step 830). Therefore, the receiver in BS 102 can always decode the control and signaling information. SS 116 then transmits the spectrally shaped control signal information (process step 860).

However, if user data is being sent in the uplink, SS 116 determines the spectral shaping filter and the corresponding parameters based on the required PAPR (process step 840). The information about the spectrum shaping filter and corresponding parameters used for data transmission may be indicated to BS 102 via the signaling and control information, which uses the predefined spectral shaping filter and parameters, as described above. SS 116 then performs spectral shaping of the user data according to the selected spectral shaping filter and the corresponding parameters (process step 850). SS 116 then transmits the spectrally shaped user data (process step 860).

In general, spectral shaping provides a larger reduction in PAPR for lower-order modulation techniques relative to higher-order modulation techniques. Lower-order modulation techniques are binary phase-shift keying (BPSK), $\pi/2$-BPSK, quadrature phase-shift keying (QPSK), or $\pi/4$-QPSK, among others. Examples of higher-order modulation techniques are 16 symbol quadrature amplitude modulation (16-QAM) and 64-QAM, among others. It is also generally the case that power-limited subscriber stations use lower-order modulations, while subscriber stations requiring high data rates use higher order modulations. Therefore, a lower PAPR is more desirable for low data rate, power limited subscriber stations. Therefore, spectral shaping coupled with lower order modulation techniques may provide significant reductions in PAPR.

Figure 9:
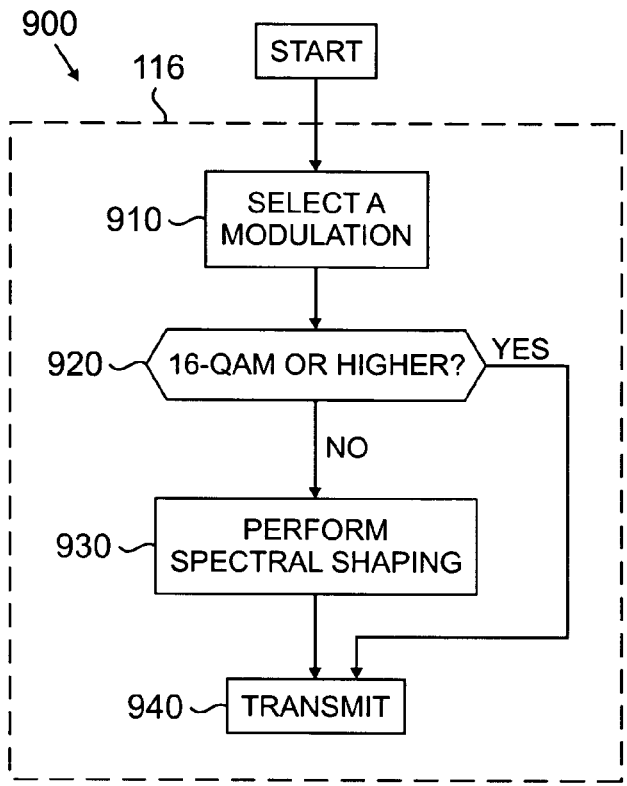
FIG. 9 is a flow diagram illustrating spectral shaping based on selected modulation technique according to one embodiment.

FIG. 9 depicts flow diagram 900, which illustrates spectral shaping based on selected modulation technique according to one embodiment of the present disclosure. In FIG. 9, it is assumed that SS 116 uses spectral shaping only for modulation techniques below 16-QAM, according to some predetermined system requirement. Initially, SS 116 selects a modulation technique according to, for example, a required data rate, a command from BS 102, or some other criteria (process step 910).

Next, SS 116 determines whether the selected modulation technique is 16-QAM or higher (process step 920). If the selected modulation technique below 16-QAM, SS 116 performs spectral shaping (process step 930) and transmits the uplink information (process step 940). If the selected modulation technique is 16-QAM or higher, SS 116 transmits the uplink information without spectral shaping (process step 940). It is noted that the high data rate subscriber stations using 16-QAM and above are generally bandwidth limited. Thus, any excess bandwidth due to spectral shaping may degrade the performance of such subscriber stations, because a relatively higher coding rate should be used to compensate for loss in bandwidth due to spectral shaping.

Figure 10:
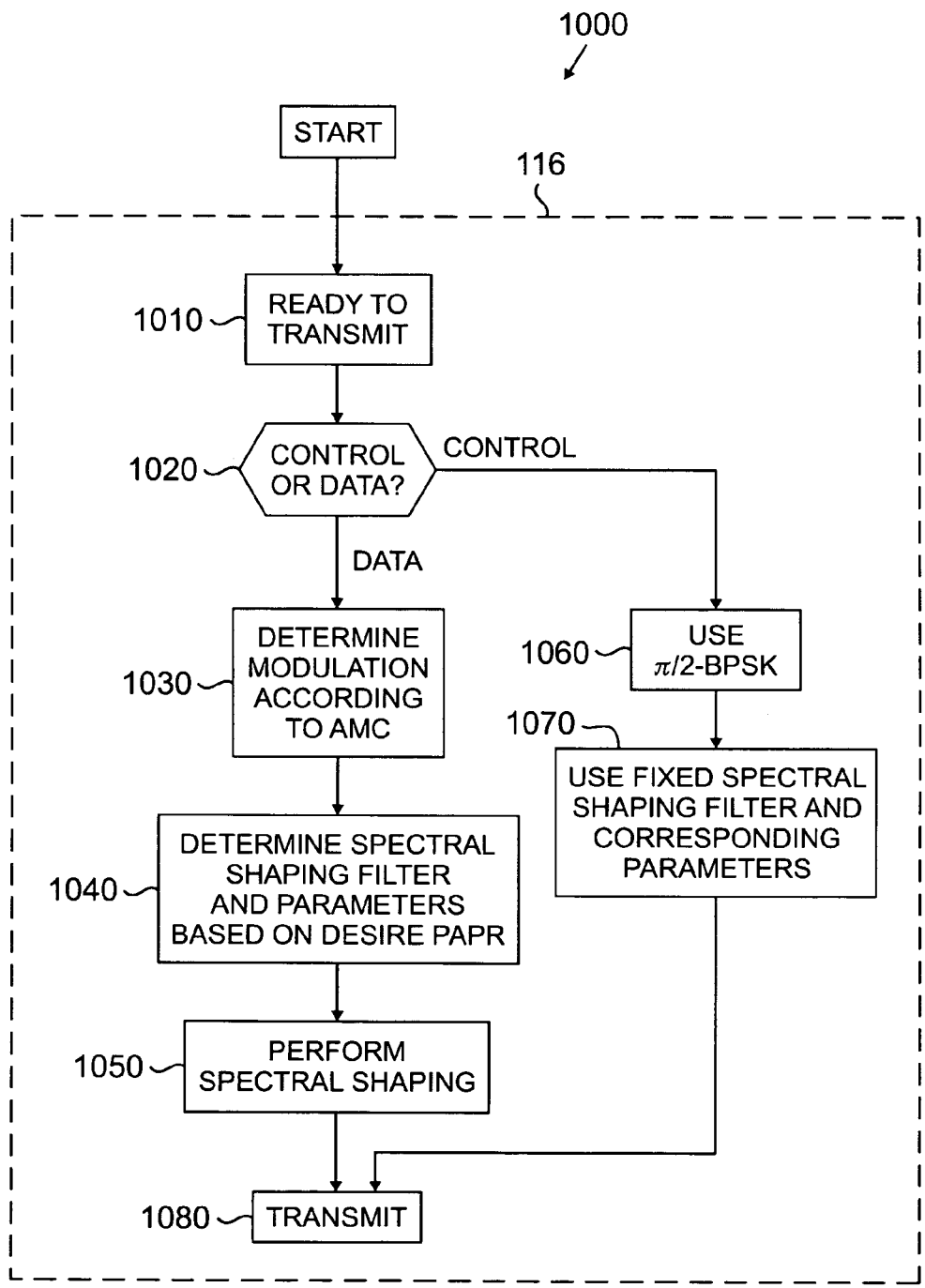
FIG. 10 is a flow diagram illustrating a process for determining whether or not spectral shaping using different spectral shaping parameters for control information and user data should be used according to another embodiment.

FIG. 10 depicts flow diagram 1000, which illustrates a process for determining whether or not spectral shaping using different spectral shaping parameters for control information and user data should be used according to another embodiment of the present disclosure. Initially, SS 116 determines that SS 116 is ready to transmit control information or user data to BS 102 (process step 1010). SS 116 then determines whether the information packet to be transmitted contains control information or user data (process step 1020).

If control information is being sent in the uplink, SS 116 uses a fixed spectral shaping filter, for which the corresponding filter parameters are known at BS 102 (process step 830). Therefore, the receiver in BS 102 can always decode the control and signaling information. SS 116 then transmits the spectrally shaped control signal information (process step 860). In general, the amount of control information is very small relative to the amount of data in a transmission. Therefore, a modulation technique that is robust and has low PAPR, such as $\pi/2$-BPSK, may be used for control information transmission (process step 1060. Also, SS 116 uses a fixed spectrum shaping filter to achieve low PAPR (process step 1070). SS 116 then transmits the spectrally shaped signaling and control information (process step 1080). It is assumed that the information about the modulation and spectrum filter is known at the receiver in BS 102, so that the signaling and control information may always be decoded.

However, if user data is being sent in the uplink, SS 116 determines the modulation technique according to the AMC parameters (process step 1030). Next, SS 116 determines the spectral shaping filter type and the corresponding parameters based on the required PAPR (process step 1040). The information about the spectrum shaping filter and corresponding parameters used for data transmission may be indicated to BS 102 via the signaling and control information, which uses the predefined spectral shaping filter and parameters, as described above. SS 116 then performs spectral shaping of the user data according to the selected spectral shaping filter and the corresponding parameters (process step 1050). SS 116 then transmits the spectrally shaped user data (process step 1080).

In one embodiment of the disclosure, the coded data symbols may be punctured in order to fit in the available bandwidth after spectrum shaping. This may be accomplished, for example, by inserting a puncturing block (not shown) between channel coding and QAM block 205 and Size M FFT block 210 in FIG. 2A. For example, if M subcarriers are allocated to a user and the original FFT size is M and raised cosine spectrum shaping is performed with roll-off value, $\alpha$, the new FFT size is $M(1+\alpha)$. This means that $M\alpha$ coded symbols are punctured. The puncturing leads to a higher coding rate for the transmitted block.

Figure 11:
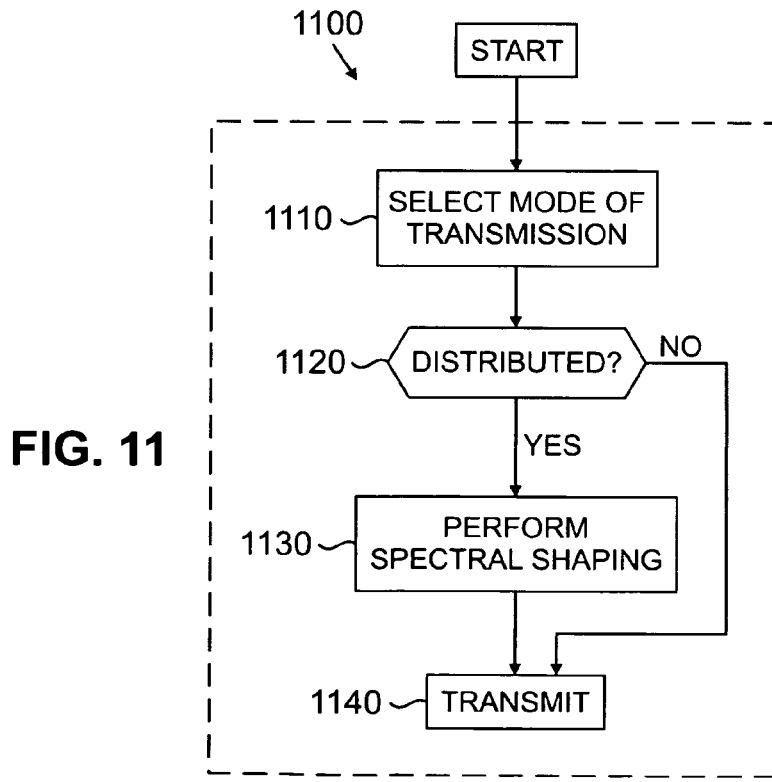
FIG. 11 is a flow diagram for determining whether or not spectral shaping should be used according to one embodiment.

FIG. 11 depicts flow diagram 1100, which illustrates a process for determining whether or not spectral shaping should be used according to one embodiment of the disclosure. In FIG. 11, spectrum shaping is performed only for the case of distributed transmission. In distributed transmission, the FFT-pre-coded data is mapped to uniformly spaced subcarriers at the input of Size N IFFT block 225. Initially, SS 116 determines the mode of transmission (process step 1110) and determines if the FFT pre-coded data are to be uniformly spaced across subcarriers (process step 1120).

In case of localized transmission modes, a contiguous set of subcarriers is used for transmission. Distributed transmission is generally used for control/signaling and small payload packets and, therefore, requires smaller bandwidth. Thus excess bandwidth due to spectrum shaping may not be an issue for these information types. Moreover, autonomous transmissions, such as random access channel, can also be transmitted using distributed mode of transmission.

If the FFT-pre-coded data are not to be distributed across uniformly spaced subcarriers, then SS 116 transmits the data without using spectral shaping filters (process step 1140). If the FFT pre-coded data are to be distributed across uniformly spaced subcarriers, then SS 116 performs spectral shaping filtering (process step 1130) and transmits the spectrally shaped uplink signal (process step 1140).

A predefined filter type and parameters may be used for spectrum shaping for distributed transmissions. Thus, signaling about the filter type and parameters is not required. In case of localized transmission, a different spectrum shaping type or parameters may be used. This also includes using no spectrum shaping filters for localized transmissions.

Figure 12:
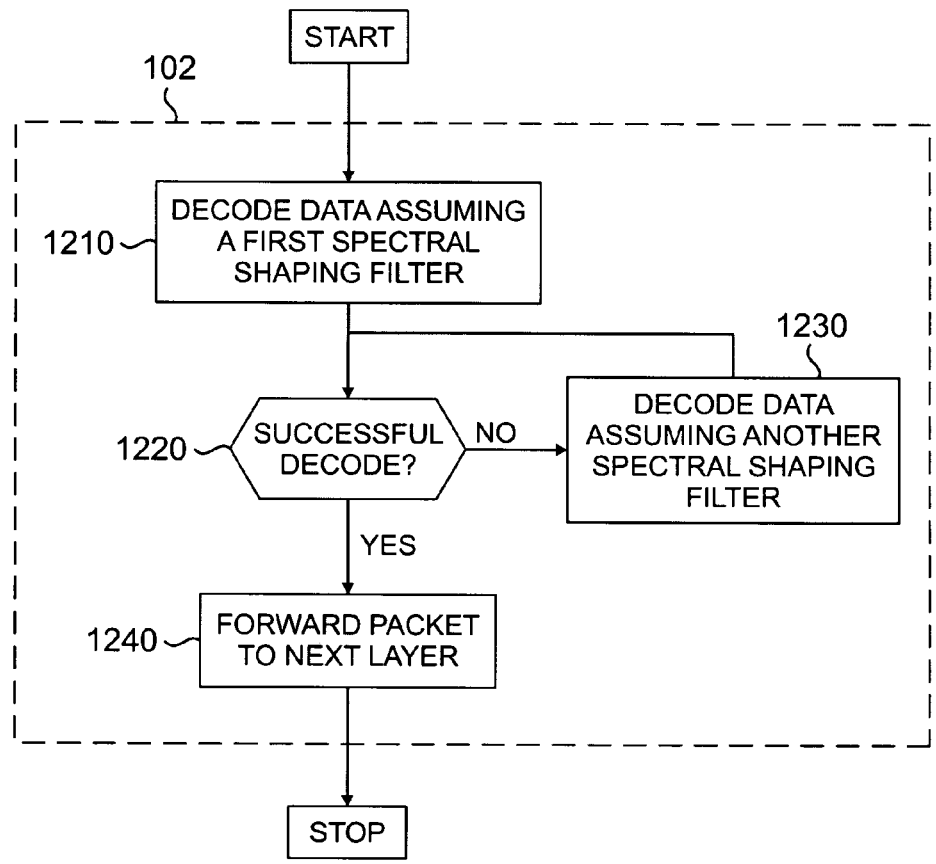
FIG. 12 is a flow diagram illustrating blind detection of the spectrum shaping filter used in transmission.

FIG. 12 depicts flow diagram 1200, which illustrates a process in BS 102 for blind detection of the spectrum shaping filter and parameter used in transmission by SS 116 according to an exemplary embodiment of the disclosure. It is assumed that the receiver in BS 102 is aware of the capabilities of SS 116 and therefore knows the set of possible spectrum shaping filters and filter parameters.

Initially, BS 102 attempts to decode the data packet assuming a first spectral shaping filter and corresponding parameters (process step 1210). BS 102 then determines whether the decode operation was successful (process step 1220). An indication of successful decoding may be, for example, detection of a correct cyclic redundancy check (CRC) value or other error detecting code.

If the decoding step using the assumed spectral shaping filter was unsuccessful, BS 102 attempts to decode the data packet assuming another (i.e., a second) spectral shaping filter and corresponding parameters (process step 1230). BS 102 again determines whether the decode operation was successful (process step 1220). Process steps 1220 and 1230 are repeated for additional assumed filter types until a successful decode operation occurs. Once the data or control information is successfully decoded, the blind detection operation is stopped and the data packet is forwarded to the next layer (process step 1240).

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. For use in a wireless network, a subscriber station configured to communicate with the wireless network according to a multi-carrier protocol, the subscriber station comprising:
a size M Fourier Transform (FT) block configured to receive input symbols and generating therefrom M FT pre-coded outputs; and
a spectral shaping filter block configured to receive the M FT pre-coded outputs and generating therefrom a plurality of spectrally shaped outputs;
wherein the subscriber station configures the spectral shaping filter block based on whether a first packet to be transmitted to the wireless network comprises control information or user data such that, when the first packet comprises user data, the subscriber station configures the spectral shaping filter block to perform spectral shaping according to a peak-to-average power (PAPR) value associated with the first packet, and when the first packet comprises control information, the subscriber station configures the spectral shaping filter block to operate as a filter type known at an intended receiver of the first packet to be used only with control information, wherein the control information comprises at least one parameter associated with the spectral shaping of user data packets.

2. The subscriber station as set forth in claim 1, wherein the subscriber station configures the spectral shaping filter block to perform spectral shaping according to a peak-to-average power (PAPR) value associated with the first packet by adjusting a roll-off factor of the spectral shaping filter block.

3. The subscriber station as set forth in claim 2, wherein the spectral shaping filter block may be configured to operate as at least one of a Raised Cosine Nyquist filter, a Gaussian filter, a Hamming filter and a Hann filter.

4. The subscriber station as set forth in claim 1, further comprising a size N inverse Fourier Transform (IFT) block, wherein the size M FT block and the size N IFT block are one of: 1) a Fast Fourier Transform (FFT) block and an inverse Fast Fourier Transform (IFFT) block; and 2) a Discrete Fourier Transform (DFT) block and an inverse Discrete Fourier Transform (IDFT) block.

5. The subscriber station as set forth in claim 4, wherein the subscriber station configures the spectral shaping filter block to perform spectral shaping according to a peak-to-average power (PAPR) value associated with the first packet by adjusting a roll-off factor of the spectral shaping filter block.

6. The subscriber station as set forth in claim 5, wherein the spectral shaping filter block may be configured to operate as at least one of a Raised Cosine Nyquist filter, a Gaussian filter, a Hamming filter and a Hann filter.

7. For use in a wireless network, a subscriber station configured to communicate with the wireless network according to a multi-carrier protocol, the subscriber station comprising:
a size M Fourier Transform (FT) block configured to receive input symbols and generating therefrom M FT pre-coded outputs; and a spectral shaping filter block configured to receive the MFT pre-coded outputs and generating therefrom a plurality of spectrally shaped outputs;

wherein the subscriber station determines whether a modulation technique used by the subscriber station is at least equal to a specified modulation order and, in response to a determination that the modulation technique is at least equal to the specified modulation order, configures the spectral shaping filter block so that spectral shaping is not performed, and wherein the subscriber station configures the spectral shaping filter block based on whether a first packet to be transmitted to the wireless network comprises control information or user data such that, when the first packet comprises user data, the subscriber station configures the spectral shaping filter block to perform spectral shaping according to a peak-to-average power (PAPR) value associated with the first packet, and when the first packet comprises control information, the subscriber station configures the spectral shaping filter block to operate as a filter type known at an intended receiver of the first packet to be used only with control information, wherein the control information comprises at least one parameter associated with the spectral shaping of user data packets.

8. The subscriber station as set forth in claim 7, wherein the subscriber station, in response to a determination that the modulation technique is not at least equal to the specified modulation order, configures the spectral shaping filter block to perform spectral shaping.

9. The subscriber station as set forth in claim 8, wherein the specified modulation order is 16-QAM.

10. The subscriber station as set forth in claim 8, wherein the spectral shaping filter block may be configured to operate as at least one of a Raised Cosine Nyquist filter, a Gaussian filter, a Hamming filter and a Hann filter.

11. A wireless transmission device configured to communicate with a receiver according to a multi-carrier protocol using orthogonal frequencies, the wireless transmission device comprising:

a spectral shaping filter block configured to perform spectral shaping on an outgoing signal, wherein the wireless transmission device configures the spectral shaping filter block based on whether a first packet in the outgoing signal comprises control information or user data such that, when the first packet comprises user data, the wireless transmission device configures the spectral shaping filter block to perform spectral shaping according to a peak-to-average power (PAPR) value associated with the first packet, and when the first packet comprises control information, the wireless transmission device configures the spectral shaping filter block to operate as a filter type known at an intended receiver of the first packet to be used only with control information, wherein the control information comprises at least one parameter associated with the spectral shaping of user data packets.

12. The wireless transmission device as set forth in claim 11, wherein the multi-carrier protocol comprises one of orthogonal frequency division multiple access (OFDMA) and orthogonal frequency division multiplexing (OFDM).

13. The wireless transmission device as set forth in claim 11, wherein the spectral shaping filter block may be configured to operate as a Gaussian filter.

14. The wireless transmission device as set forth in claim 11, wherein the wireless transmission device configures the spectral shaping filter block to change from a first filter type to a second filter type according to the PAPR value associated with the outgoing signal.

15. The wireless transmission device as set forth in claim 11, wherein the wireless transmission device configures the spectral shaping filter block to perform spectral shaping according to a peak-to-average power (PAPR) value associated with the first packet by adjusting a roll-off factor of the spectral shaping filter block.

16. The wireless transmission device as set forth in claim 15, wherein the spectral shaping filter block may be configured to operate as at least one of a Raised Cosine Nyquist filter, a Gaussian filter, a Hamming filter and a Hann filter.

17. A wireless transmission device configured to communicate with a receiver according to a multi-carrier protocol using orthogonal frequencies, the wireless transmission device comprising:

a spectral shaping filter block configured to perform spectral shaping on an outgoing signal, wherein:

the wireless transmission device determines whether a modulation technique used by the wireless transmission device is at least equal to a specified modulation order and, in response to a determination that the modulation technique is at least equal to the specified modulation order, configures the spectral shaping filter block so that spectral shaping is not performed; and the wireless transmission device configures the spectral shaping filter block based on whether a first packet in the outgoing signal comprises control information or user data such that, when the first packet comprises user data, the wireless transmission device configures the spectral shaping filter block to perform spectral shaping according to a peak-to-average power (PAPR) value associated with the first packet, and when the first packet comprises control information, the wireless transmission device configures the spectral shaping filter block to operate as a filter type known at an intended receiver of the first packet to be used only with control information, wherein the control information comprises at least one parameter associated with the spectral shaping of user data packets.

18. The wireless transmission device as set forth in claim 17, wherein the wireless transmission device, in response to a determination that the modulation technique is not at least equal to the specified modulation order, configures the spectral shaping filter block to perform spectral shaping.

19. The wireless transmission device as set forth in claim 18, wherein the specified modulation order is 16-QAM.

20. The wireless transmission device as set forth in claim 18, wherein the spectral shaping filter block may be configured to operate as at least one of a Raised Cosine Nyquist filter, a Gaussian filter, a Hamming filter and a Hann filter.

* * * * *